(No Model.) 3 Sheets—Sheet 1.

G. W. McANINCH.
WORKMAN'S TIME RECORDER.

No. 510,811. Patented Dec. 12, 1893.

WITNESSES:
C. Neveux
C. Sedgwick

INVENTOR
G. W. McAninch
BY
Munn & Co
ATTORNEYS.

(No Model.) 3 Sheets—Sheet 2.
G. W. McANINCH.
WORKMAN'S TIME RECORDER.
No. 510,811. Patented Dec. 12, 1893.
Fig. 4
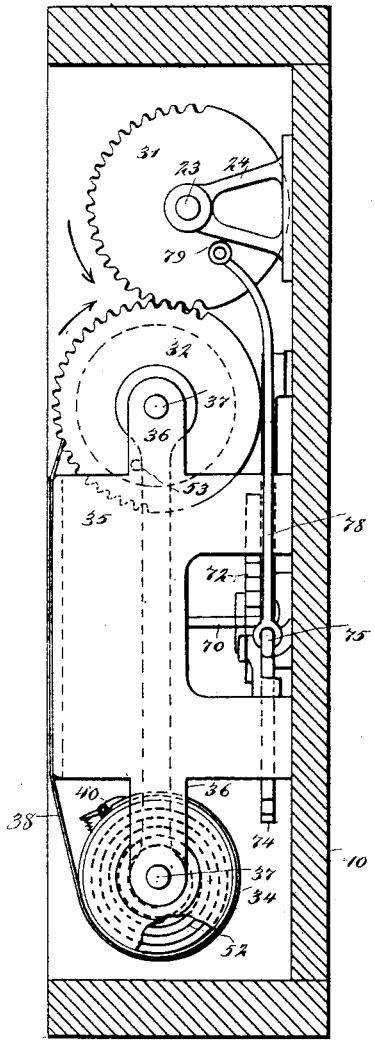
Fig. 5
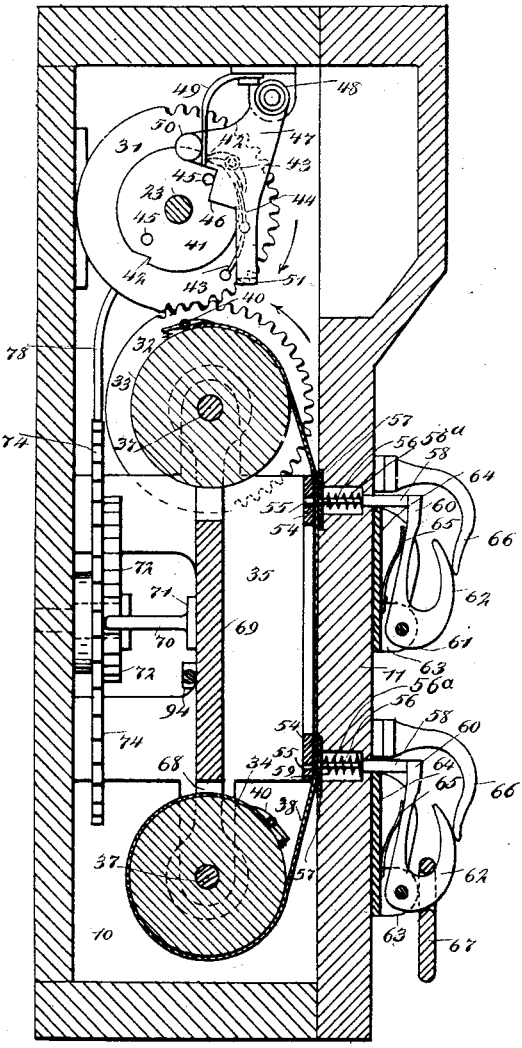
Fig. 7     Fig. 6
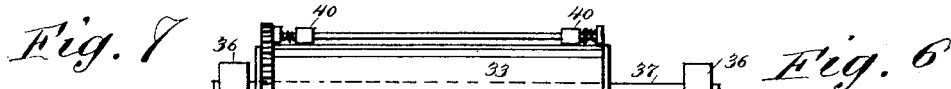
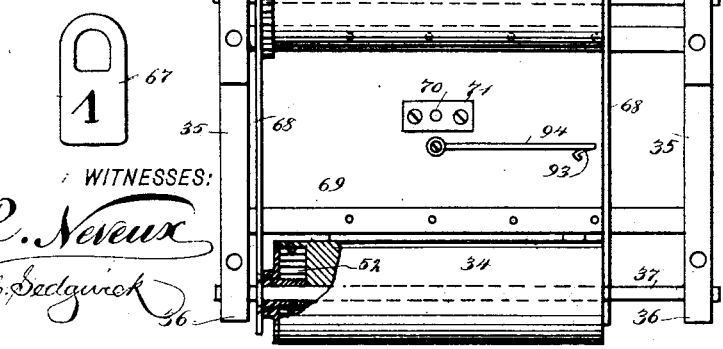
WITNESSES:
C. Neveux
C. Sedgwick
INVENTOR
G. W. McAninch
BY
Munn & Co
ATTORNEYS.
THE NATIONAL LITHOGRAPHING COMPANY,
WASHINGTON, D. C.

(No Model.) 3 Sheets—Sheet 3.

G. W. McANINCH.
WORKMAN'S TIME RECORDER.

No. 510,811. Patented Dec. 12, 1893.

WITNESSES:
C. Neveux
C. Sedgwick

INVENTOR
G. W. McAninch
BY Munn & Co
ATTORNEYS.

UNITED STATES PATENT OFFICE.

GEORGE W. McANINCH, OF DAVENPORT, IOWA.

WORKMAN'S TIME-RECORDER.

SPECIFICATION forming part of Letters Patent No. 510,811, dated December 12, 1893.

Application filed February 25, 1893. Serial No. 463,699. (No model.)

*To all whom it may concern:*

Be it known that I, GEORGE W. MCANINCH, of Davenport, in the county of Scott and State of Iowa, have invented a new and Improved Workman's Time-Recorder, of which the following is a full, clear, and exact description.

My invention relates to improvements in that class of machines which are adapted to be operated by the individual employés in shops, factories, and the like, whenever such employés begin or leave off work, and which is adapted to keep an accurate record of the time of each employé and produce the record on the time sheet in such a manner that the sheet may be preserved and the total time of each workman quickly and accurately footed up. The machine is adapted to be operated, as above remarked, by each workman, and the workman therefore cannot dispute the record.

A further object of my invention is to construct the machine in such a way that it is not liable to get out of order, and to adapt it to automatically adjust itself day by day so that the record will be made on the time sheet in the right place, and also to provide means for setting the machine at the end of each week.

To these ends my invention consists in certain features of construction and combinations of parts, as will be hereinafter described and claimed.

Reference is to be had to the accompanying drawings, forming a part of this specification, in which similar figures of reference indicate corresponding parts in all the views.

Figure 1:
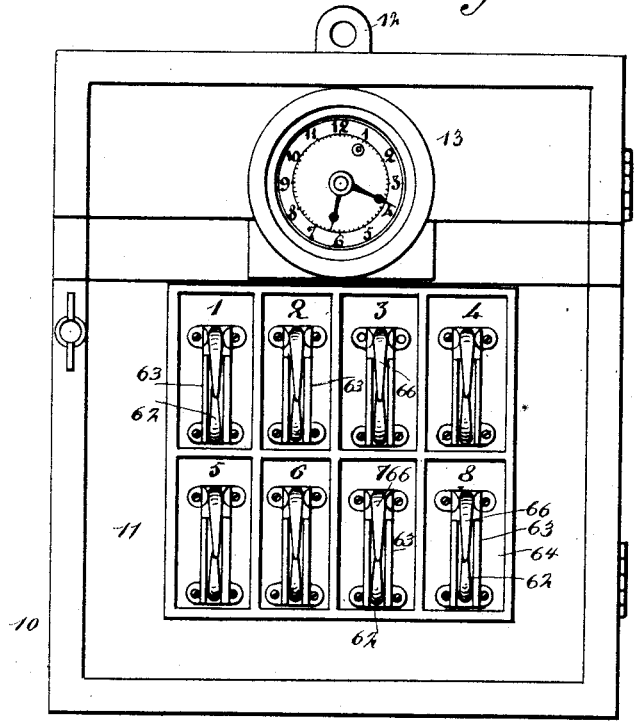
Figure 2:
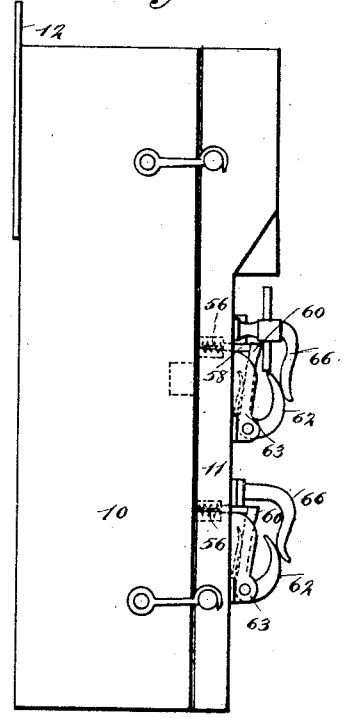
Figure 3:
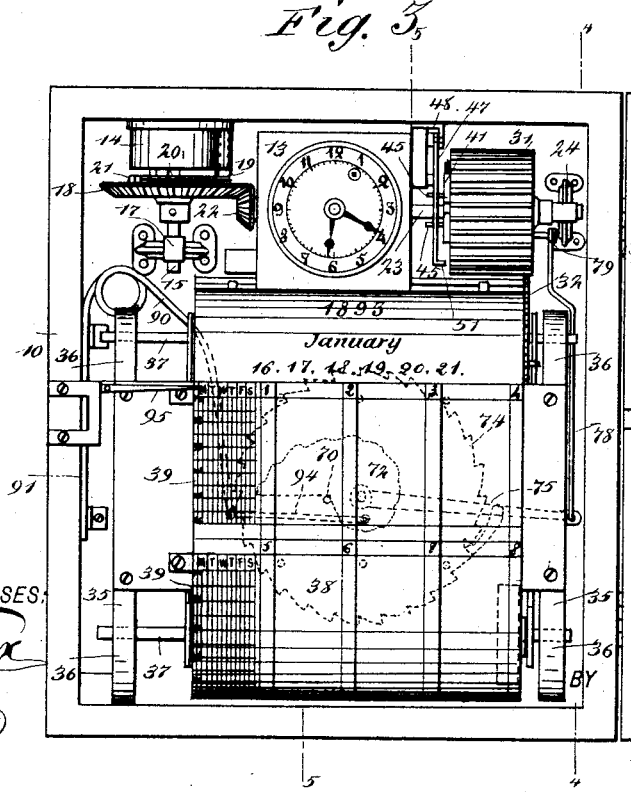
Figure 8:
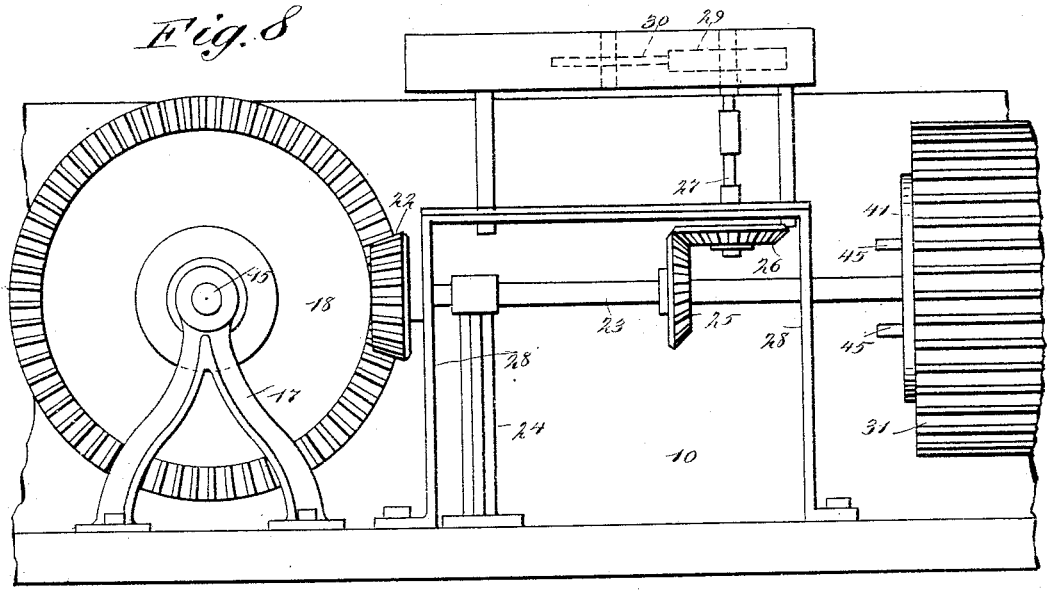
Figure 9:
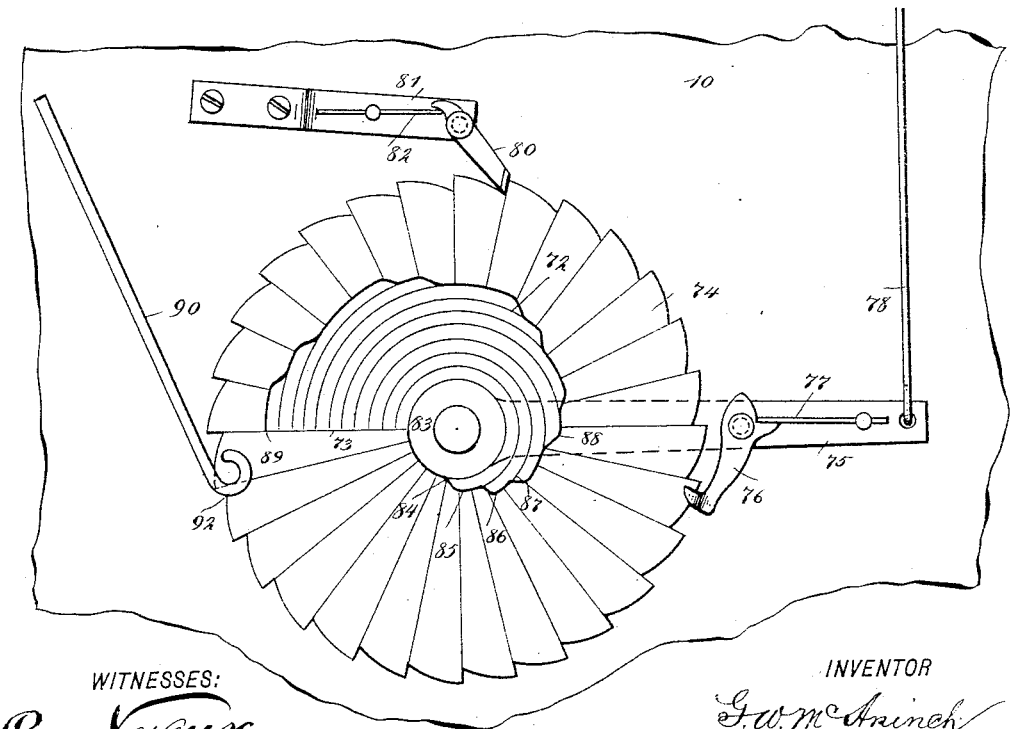

Figure 1 is a front elevation of the machine embodying my invention. Fig. 2 is a side elevation of the same. Fig. 3 is a front elevation with the lid open. Fig. 4 is a section on the line 4—4 in Fig. 3. Fig. 5 is a section on the line 5—5 in Fig. 3. Fig. 6 is a detail elevation of the time sheet rollers and their supports and connections. Fig. 7 is a detail view of one of the time checks which may be used with the machine. Fig. 8 is a broken enlarged plan of the driving shaft, its connections with the clock mechanism, the gear wheel for driving the shaft, and the driving roller on the shaft; and Fig. 9 is an enlarged view of the ratchet and cam mechanism for moving the rollers and time sheet laterally.

The machine is provided with a suitable box-like case 10 having a swinging lid 11, and the case is preferably provided with a hanger 12 to enable it to be hung upon a nail, while within the case is an ordinary clock 13 which should be capable of running eight days without rewinding. The mechanism of the machine is driven by a stout coil spring 14 which is arranged in the usual way to drive a vertical shaft 15 which turns in a suitable support 17, and the shaft is provided with a driving pinion or gear wheel 18 which connects with the coil spring by means of the usual ratchet mechanism, consisting of a ratchet wheel 20 on the shaft, a connection 19 between the ratchet wheel and the free end of the spring 14, and a pawl 21 pivoted on the gear wheel and adapted to engage the ratchet wheel. This mechanism is not shown in detail as it is of the usual kind and is adapted to prevent the too rapid unwinding of the spring. The driving gear 18 meshes with a pinion 22 on the driving shaft 23 which is supported in the upper portion of the case and turns in suitable bearings 24, and on the shaft is a bevel pinion 25, see Fig. 8, which meshes with a pinion 26 on a horizontal shaft 27, this shaft turning in a suitable support 28 and on it is a gear wheel 29 which meshes with the hour wheel 30 of the clock mechanism. This construction causes the driving mechanism to be controlled by the clock. On the shaft 23 is a loose driving roller 31 having cogs on one side, although the cogs may extend entirely around it if desired, and the roller drives the rollers carrying the time sheet, the roller 31 meshing with a cog wheel 32 on one end of the roller 33 which is arranged beneath and parallel with the shaft 23, and near the bottom of the case and parallel with the roller 33 is another roller 34, both rollers being journaled in a supporting frame 35 which has lugs 36 at top and bottom to support the shafts 37 on which the rollers 33 and 34 slide, the sliding movement of the rollers being sufficient to enable the time sheet which they carry to be moved a distance corresponding to a week's space of time, as indicated on the sheet, all of which will appear from the description to follow. The rollers carry a time sheet 38 which is marked off into a series of spaces 39, there being a space for each workman, and these spaces are ruled vertically to represent the several days of the week and transversely to represent the hours or fractions thereof of each day. The time sheet is secured to the two rollers by spring catches 40 which may be of any approved construction, and the time sheet serves as a belt and causes the two rollers to move in unison. The upper roller is moved by the gear mechanism described, so as to move the time sheet and the lower roller in one direction, and the lower roller is moved in the opposite direction by a coil spring to be hereinafter described. As above remarked the driving roller 31 is loose on the driving shaft, and secured to the shaft near one end of the roller is a disk or wheel 41 having in diametrically opposite edges notches 42 which are adapted to engage a pawl 43 which is pivoted on the end of the roller 31 and this is normally pressed into engagement with the wheel by a spring 44. Projecting from one side of the wheel 41 and on opposite sides of the shaft 23 are pins 45, which are adapted to engage a shoulder 46 of a swinging arm 47 which is pivoted adjacent to the wheel on a support 48 and which is pressed into engagement with the pins by a spring 49 secured to an adjacent support and arranged to press against a stud 50 on the arm. The free end of the arm 47 is bent laterally, as shown at 51, and this bent end is adapted to strike the tail of the pawl 43, when the arm is sprung suddenly inward. As the driving shaft 23 revolves, the pawl 43 engages one of the notches 42 of the wheel 41, and the driving roller 31 is turned so as to revolve the roller 33 and raise the time sheet 38 and also turn the roller 34. This engaging and releasing mechanism just described is timed in such a way that the pawl 43 engages in one of the notches at seven a. m., is released at a few minutes after twelve, to give the employés time to work the recorder, and engages again at one o'clock and is released shortly after six, but this arrangement is arbitrary and the device may be timed according to circumstances. At every turn the pawl 43 is released, the time sheet and the rollers are returned to their normal positions by a coil spring 52 which is arranged in one end of the roller 34, see Fig. 6, one end being attached to an adjacent strip 68, and the other to the roller, and the movement of the rollers in the reverse direction is limited by a stud 53, see Fig. 4, which is secured to the roller 32 and is adapted to strike an adjacent abutment. Immediately behind the sheet 38 are cross bars 54 which serve as a table or support for the sheet and in each cross bar are perforations 55 through which perforating needles 56 are adapted to extend, these needles being held to slide transversely in the lid 11 and through guide plates 57 on the inner side of the lid. The needles have heads 58 which project outward through the lid and the heads are normally pressed out by spiral springs 56$^a$ which encircle the shanks of the needles between the guide plates and the heads. The head of each needle extends into the path of an arm 60 on a swinging lever 61, the outer end of which terminates in a hook 62 and this lever is pivoted between lugs 63 on a face plate 64 which is secured to the lid 11, and the arm 60 is normally pressed outward, so as to permit the outward movement of the needle, by a spring 65. See Fig. 5. The hook 62 contacts with a curved arm 66 which is fixed to the lid and extends downward opposite the hook. There are as many of these hooks, needles, and spaces 39 on the time sheet as there are employés, and any necessary number may be provided and all are appropriately numbered, while each employé is provided with a check 67 which may be of the form shown in Fig. 7, and which is perforated to permit it to be placed upon the hook 62. The check is numbered to represent the number of the workman, and the number of this particular hook. To place the check upon the hook it is necessary to push it between the hook 62 and the arm 66, and this movement swings inward the arm 60 and forces the needle inward so that a perforation is made in the time sheet. The same effect is had when the check is removed, and consequently when the workman comes to his work in the morning, he places his check upon the hook and a puncture is made in the time sheet at a point coincident with the mark on the sheet representing the hour of the day. When the workman leaves his work, it is necessary for him to remove his check and another puncture is made which will indicate the time he left off, as the time sheet is constantly moved forward at a regular rate corresponding to the progress of time.

The mechanism already described provides for moving the time sheet vertically and returning it, but mechanism must be provided for moving it laterally so that the punctures will come on different vertical lines and correspond to the lapse of time between the morning, noon and night hours, as well as from day to day during the week. To facilitate this movement, the rollers are connected together by strips 68 and between these is secured a plate 69 which is preferably of wood and on the back of this is a laterally extending pin 70 having a flange 71 to facilitate its attachment to the plate, and this pin extends into the path of a cam 72 which has an abrupt radial shoulder 73 and the construction of which, as well as its operation in moving the plate and rollers, will be hereinafter described. The cam is carried by a ratchet wheel 74, journaled in the back of the case, which ratchet wheel is preferably provided with twenty-eight teeth, although the number of teeth is arbitrary, and the ratchet wheel is adapted to be moved one notch at every reverse or backward movement of the time sheet, so that at said movement it will turn the cam and advance the rollers and time sheet laterally in the manner described below. On the same center with the ratchet wheel is pivoted a swinging lever 75 on which is a pawl 76 which engages the teeth of the ratchet wheel, and the pawl is held in engagement with said teeth by a spring 77. A connecting rod 78 leads upward from the free end of the lever, and this rod at its upper end, is pivotally connected, as shown at 79, to one end of the driving roller 31. It will be seen then that as the driving roller is turned upward to raise the time sheet, the pawl will be gradually lifted and at the time the driving roller is released, the pawl 76 will have traveled the distance of one tooth on the ratchet wheel, so that at the return movement of the rollers and time sheet the pawl will be depressed and the ratchet wheel advanced a distance of one tooth. The ratchet wheel is prevented from turning in the wrong direction by a detent 80, which is pivoted on a support 81 and is pressed into engagement with the ratchet wheel by a spring 82. At the end of the week on Saturday night the pin 70 will rest against the face of the cam 72, at a point 83 next the shoulder 73; it will be seen that the radius of the cam is the same at any point from 83 to 84, and this distance corresponds with the movement of the ratchet wheel from Saturday night until Monday morning; at seven o'clock Monday morning or at the beginning of working hours, the pin will be at the point 84 and the cam is inclined from 84 to 85 so that the movement of the ratchet wheel and cam, during the forenoon, will cause the cam to push on the pin 70 so as to move the pin, the roller plate 69, the rollers 33 and 34, and the time sheet 38 to the left, and at the time the driving mechanism is released at noon, the pin will come opposite another plane face of the cam, so that the rollers will not be moved, and after a suitable interval the pin strikes another inclined face 86 of the cam which causes the pin and rollers to be again moved, and at suitable intervals it comes in contact inclined surfaces 87 and 88 and similar surfaces up to the point 89 which represents the radius of the cam and which is coincident with the shoulder 73. The pin will not have reached the point 89 until Saturday night, after which it passes the shoulder and is again brought opposite the smallest radius of the cam. The several inclinations or convolutions of the cam are turned so as to move the time sheet to the left, and it will be seen then that the time sheet will be regularly moved up and down so that the punctures will appear therein at different heights, according to the times at which they are made, and at every downward movement of the sheet, the ratchet wheel 74 will be turned, as described, and the sheet moved to the left so as to bring the punctures in a different vertical plane, and in this way an accurate record is kept through the week. The rollers, the time sheet, and the plate 69 are returned at the end of each week by a spring 90 which is secured to one side of the case, as shown at 91, in Fig. 3, and the free end of this spring terminates in a coil 92, see Fig. 9, which is adapted to engage a coil 93 on the end of a stiff wire 94 which is secured to the plate 69. When the machine is moved to the left then the coil 93, acting on the spring 90, will gradually push the spring on the plate 69, thus increasing the tension on the spring, and when the plate and the rollers have reached the limit of their movement and the pin 70 drops over the shoulder 73, the spring throws the carriage, that is the plate 69, back to its original position. For convenience a pointer 95, see Fig. 3, may be arranged adjacent to the sheet 38, so as to overlap the same, and the free end of the pointer is made to come opposite the portion of the time sheet on which the punctures are to be made. The last row of punctures may thus be easily located by reference to the pointer.

The operation of the machine will be clearly understood from the foregoing description, and in a general way the operation is as follows:—When the workman begins work, he places his check upon the hook 62 and a puncture is made in the time sheet as specified, after which the sheet moves, as described, and when the check is removed another puncture is made, this puncturing and moving of the sheet going on throughout the week and the sheet being moved gradually from right to left in the manner specified, so that at the end of the week a complete record of the workman's time is made and the sheet may be filed away for reference.

Having thus described my invention, I claim as new and desire to secure by Letters Patent—

1. A time recorder, comprising oscillating rollers driven in one direction by a clock-work mechanism and returned in the opposite direction by a spring, a time sheet detachably secured to the rollers and provided upon its face with ruled spaces to represent periods of time, spring-repressed needles arranged opposite the time sheet and adapted to puncture the same, swinging hook levers fulcrumed adjacent to the needles and adapted to force the same inward, the hooks being arranged to receive a time check, and curved arms arranged adjacent to the hooks of the levers and adapted to contact therewith, substantially as described.

2. A time recorder, comprising parallel oscillating rollers, a time sheet connecting the rollers and provided upon its face with marks indicative of periods of time, a clock-work-controlled driving mechanism for turning the rollers in one direction, mechanism for tripping and returning the rollers, a cam mechanism for moving the rollers endwise, spring-repressed puncturing needles arranged opposite the time sheet, and swinging hook levers adapted to receive a time check and to swing against the needles, the hooks of the levers having a normally closed entrance, substantially as described.

3. A time recorder, comprising oscillating rollers connected together by a plate or carriage, a detachable time sheet connecting the rollers, a clock-work mechanism for oscillating the rollers in one direction, a tripping device for automatically releasing the rollers from their driving mechanism, means for returning the rollers to their normal positions, a cam and ratchet mechanism for moving the roller carriage laterally, spring-repressed puncturing needles arranged opposite the time sheet, and swinging hook-levers adapted to receive a time check and to swing against the puncturing needles, the hooks of the levers having a normally closed entrance, substantially as described.

4. In a time recorder, the combination with the oscillating repressed rollers, the time sheet carried by the rollers, and puncturing mechanism for puncturing the time sheet, of a clock-work driven shaft, a loose gear on the shaft geared to the rollers, a notched wheel secured to the shaft and adapted to engage a pawl on the loose gear, a swinging arm suspended adjacent to the driving shaft and adapted to strike and release the pawl, and mechanism, as the pins on the wheel, for moving the swinging arm against the tension of its spring, substantially as described.

5. In a time recorder, the combination, with the oscillating rollers, the oscillating shaft for driving the same, the carriage connecting the rollers, the time sheet carried by the rollers, and the puncturing mechanism for punching the sheet, of a ratchet wheel journaled opposite the roller carriage and turned by the driving gear of the rollers, a cam carried by the ratchet wheel, and mechanism for moving the carriage and rollers endwise by the movement of the cam, substantially as described.

6. In a time recorder, the combination, with the oscillating rollers, the time sheet carried thereby, the oscillating driving gear connected with the rollers, the puncturing mechanism for punching the time sheet, and a carriage connecting the rollers, of a revoluble ratchet wheel journaled behind the carriage, a lever mechanism for turning the ratchet wheel tooth by tooth by the movement of the oscillating driving gear, a cam carried by the ratchet wheel, a pin secured to the carriage and extending into the path of the cam, and a spring mechanism for oscillating the carriage after it has been actuated by the cam, substantially as described.

7. In a time recorder, the combination with the time sheet and mechanism for moving it vertically and laterally, of the spring-repressed puncturing needles arranged opposite the sheet, the swinging hook-levers fulcrumed adjacent to the needles and adapted to receive a time check and also to swing against the needles, and curved arms arranged adjacent to the hook levers and contacting with the hooks thereof, substantially as described.

8. In a time recorder, the combination with the vertically and laterally movable time sheet and the perforated cross bars serving as a backing for the sheet, of the spring-repressed puncturing needles arranged opposite the sheet and adapted to move through the perforations in the bars, swinging hook-levers fulcrumed adjacent to the needles and adapted to contact therewith, the levers having hooks to receive a time check, and curved arms or abutments arranged adjacent to the levers and contacting with the outer surfaces of the lever hooks, substantially as described.

GEORGE W. McANINCH.

Witnesses:
L. G. SUSEMIHL,
L. N. PORTER.